INVENTOR.
Gerald H. Kadel

Jan. 9, 1962 G. H. KADEL 3,015,947
APPARATUS FOR TESTING PLASTIC LAMINATES AT ELEVATED
TEMPERATURES IN AN OXYGEN-FREE ATMOSPHERE
Filed Aug. 17, 1960 2 Sheets-Sheet 2

INVENTOR.
Gerald H. Kadel
BY John Eneman
Arthur L. Collins
Attorneys 3,015,947
APPARATUS FOR TESTING PLASTIC LAMINATES AT ELEVATED TEMPERATURES IN AN OXYGEN-FREE ATMOSPHERE
Gerald H. Kadel, Elkton, Md., assignor to the United States of America as represented by the Secretary of the Navy
Filed Aug. 17, 1960, Ser. No. 50,295
1 Claim. (Cl. 73—15.6)
(Granted under Title 35, U.S. Code (1952), sec. 266)

The invention described herein may be manufactured and used by or for the government of the United States of America for governmental purposes without the payment of any royalties therein or therefor.

This invention relates to testing of materials and relates more particularly to an apparatus which provides a means to run flexure and compression tests on plastics at elevated temperatures in the absence of oxygen.

Under the prior art, it was the custom to test these plastics inside of a 12 cubic foot gas-tight oven. In order to carry out flexure and compression tests in the absence of oxygen, it was necessary to introduce nitrogen or some other gas into the entire inside of the oven in order to purge the air therefrom. This was not satisfactory because the oxygen content could not be reduced below four percent by volume even though a large amount of nitrogen was used. In addition, in order to conserve the gas, samples had to be inserted through a hand hole on the side of the oven. This created a problem in placing the samples in their proper position for conduction of the test, and manipulation of them became very difficult at temperatures above 500° F.

An object of the invention is to provide an improved testing device, with which it will be possible to obtain an environmental atmosphere free of oxygen, which may be easily applied to existing types of ovens without greatly altering the present construction thereof, which because of its compactness permits a large saving in the amount of environmental gas required for each test specimen, and which will be relatively simple, compact, convenient, practical and inexpensive.

Another object of the invention is to provide an improved testing device which will facilitate the location of specimens inside of the device for testing purposes thereby greatly shortening the time required to test each specimen.

Various other objects and advantages will be apparent from the following description of one embodiment of the invention, and the novel features will be particularly pointed out hereinafter in connection with the appended claim.

In the accompanying drawing:

FIG. 2 is a perspective view of the bottom part of the device;

Figure 1:
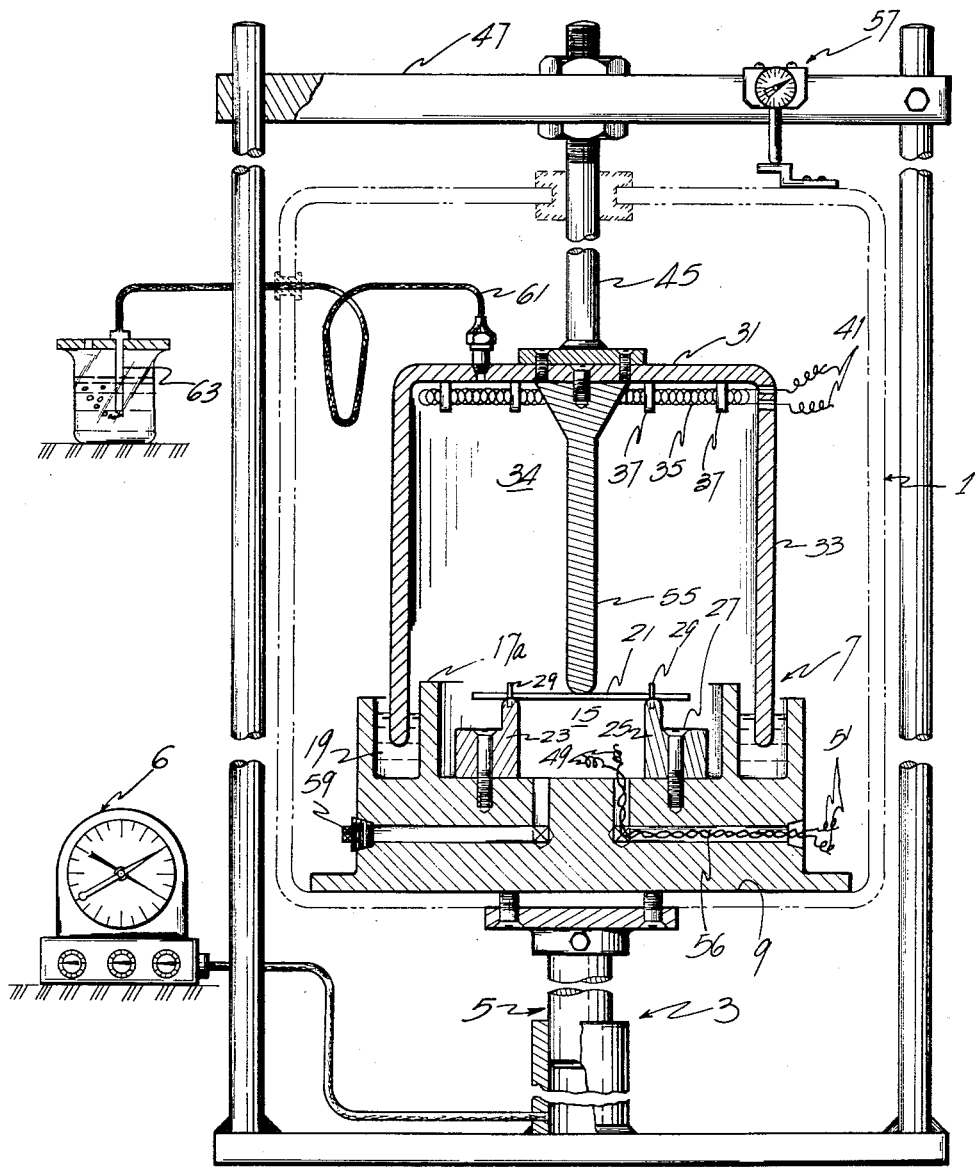
FIG. 1 is a front elevation in a cross-scetion of a typical and illustrative embodiment of this invention.

In accordance with the illustrative embodiment of the invention, provision is made for mounting a flexural test specimen inside of a closed container, having some degree of vertical movement between the upper and lower parts to permit the application of mechanical stress, in which the specimen may be heated to the desired testing temperature, suitable mean being provided for externally applying a load of desired magnitude to the specimen so as to cause the specimen to be flexed. This device is designed to isolate the effects caused by oxidation from those caused by temperature.

It will be understood that the foregoing general description and the following detailed description as well are exemplary and explanatory but are not restrictive of the invention.

Referring now more particularly to the accompanying drawing, a convention oven 1 is placed on the loading jack 3 of a 60,000 pound Baldwin Southwark Universal Testing Machine 5.

This is a typical testing machine which is purchased in the open market and is not a part of this invention.

The two-part container 7 is now placed on the floor 9 of the oven. The base portion (FIG. 2) comprises a rectangular plate 11 having a cylindrical upwardly extending edge 13 integral therewith so as to form a bottom chamber 15 open at the top and closed at the bottom. An annular ring 17 is fastened to the plate by welding or other like means. The diameter of the ring is smaller than the edge diameter so that it fits inside of the edge 13. The ring 17 is concentric with the edge 13 and is spaced therefrom to form a liquid-tight compartment 19 between the ring and the edge. The ring 17 extends a slight distance above the top of the edge 13 as shown at 17a.

Means are provided for supporting a standard flexural test specimen 21 inside of the bottom chamber 15. The embodied means permits ready installation and removal of the test specimen. As here preferably embodied, the specimen holders 23 and 25, preferably of cylindircal contour throughout their length, are suitably fastened to the plate 11 with screws 27 or the like. Pins 29 are located in the top of the specimen holders to position the sample therebetween.

Figure 3:
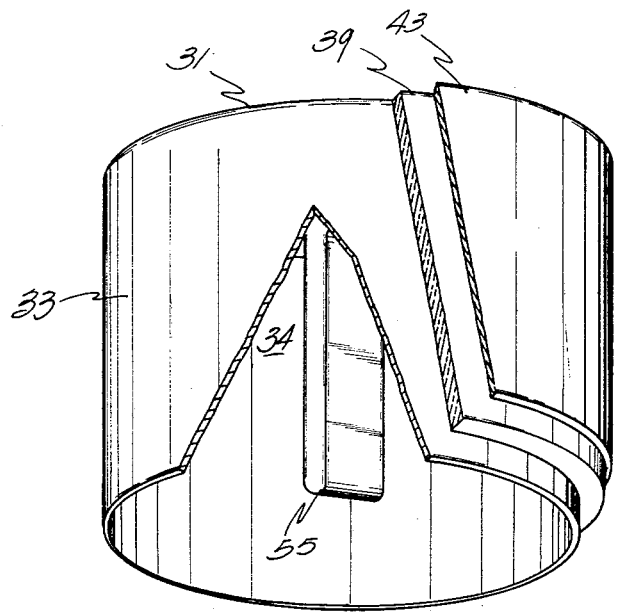
FIG. 3 is a perspective view of the top part of the device.
Figure 4:
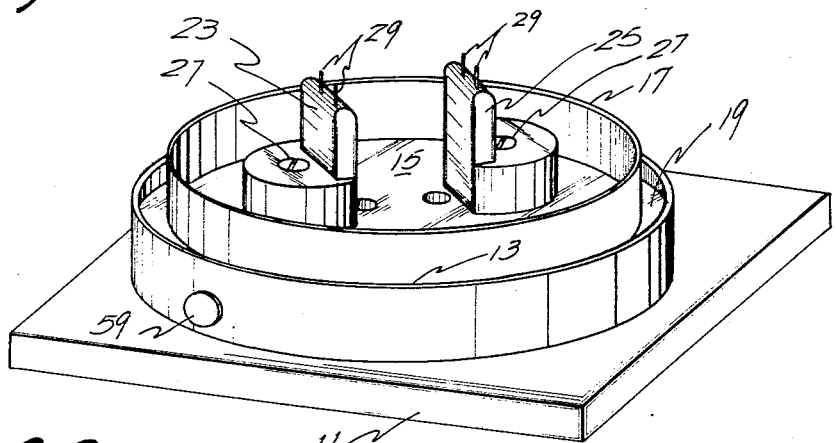

The top portion (FIG. 3) has a circular plate 31 having a cylindrical downwardly extending edge 33 so as to form a top chamber 34 closed at the top and open at the bottom. The diameter of the top plate 31 is smaller than the diameter of the edge 13 so that its leading edge 33 will be received into the groove 19 when the bottom portion is raised by action of the jack 3.

As here preferably embodied, an annular resistance heating element 35 is held firmly to the plate 31 by the retaining means 37. The edge 33 is jacketed with insulation 39 of required thickness through which pass the power leads 41 to a suitable power source (not shown). A retaining ring 43 is then placed around the insulation to hold it firmly in place.

A ram 45, fastened in any suitable manner to plate 31, extends through the top of the oven 1 and is permanently mounted in the top 47 of the testing machine 5.

This ram holds the top part of container 7 firmly in position and permits the oven to be moved vertically up and down thereon by action of the jack 3.

One or more thermocouple beads 49 are placed inside of chamber 15 and may be connected by lead wires 51, which are led sealingly through the base (FIG. 2) and out of the oven through the sealing flange 53 to suitable temperature indicators (not shown).

In operation, a flexural test specimen 21 is positioned on the holders 23 and 25 between the pins 29. The groove 19 is filled with a fusible alloy known as Darcet's metal. This alloy is composed of 25 parts by weight of tin, 25 parts by weight of lead, and 50 parts by weight of bismuth, and has a melting point of 203° F. It is non-toxic and will provide a liquid seal at temperatures up to 2000° F. Although Darcet's metal has provided the best results, other high boiling point liquids such as heat treating salts could be used as a liquid sealing means Sealants of limited toxicity could be used with proper venting of the oven..

After the sample has been positioned and the alloy melted to form a liquid pool in groove 19, the oven 1 is raised by the jack 3 to a position as shown in FIG. 1 so that the loading nose 55, integral with the plate 31, is close to the specimen. A position indicator 57 is mounted on the outside of the oven to ascertain this position. The edge 33 of the upper part of container 7 is carried into the liquid metal whereby a seal is formed between the two parts of the container forming an airtight chamber therein.

Nitrogen or any suitable inert gas is introduced into the chamber 15 through the inlet 59, located at the rear of the lower edge 13 from a suitable source (not shown). Any air in the container is displaced by the nitrogen and forced out the outlet tubing 61, located in the plate 31, and then through a bubble tube 63. A bubble rate of 30 to 60 bubbles a minute is enough to insure sufficient pressure to prevent air from entering the container.

The heating element 35 makes it possible to raise the temperature inside the container above that of the oven temperature on the outside of the container. The thermocouple 49 gives the inside container temperature. When the inside chamber attains the test temperature, the oven is raised so that the loading nose bears upon the test specimen causing it to flex. The time to failure of the specimen is recorded by the recording mechanism 6. After the test is completed, the oven is lowered. This causes the container 7 to open up and a new sample can be positioned inside.

By employing this device inside of a conventional oven, a large savings can be realized in the nitrogen and heat requirements for each sample being tested.

The invention in its broader aspects is not limited to the specific mechanisms shown and described but departures may be made therefrom within the scope of the accompanying claim without departing from the principles of the invention and without sacrificing its chief advantages.

What is claimed is:

An apparatus for testing flexure and compression of plastic materials at elevated temperatures in an oxygen-free atmosphere comprising in combination a base portion having a cylindrical upwardly extending edge forming a bottom chamber open at the top and closed at the bottom; an annular ring attached to the bottom of the base extending upwardly concentric with and spaced from the said edge whereby an annular groove is formed between the ring and the said edge; two cylindrical retainers positioned inside of the ring and being attached to the bottom of the base for holding a test specimen therebetween; an alloy consisting of 25 parts by weight of tin, 25 parts by weight of lead and 50 parts by weight of bismuth placed within the grooves, said alloy melting at 200° F. being capable of providing a non-toxic metallic liquid seal up to 2000° F.; a circular top portion having a diameter smaller than that of the base and having a cylindrical downwardly extending edge forming a top chamber closed at the top and open at the bottom, said top portion being capable of receiving the bottom portion whereby its lower edge extends into the liquid metal sealing means thereby forming an airtight evacuable chamber around the test specimen; a loading edge attached to the circular top portion for applying a flexual load to the specimen when the top and bottom portions are in sealed relationship; inlet means connected to the base portion for introducing a gas into the chamber; outlet means connected to the top portion for evacuating any air from the chamber; heating coils attached to the inside of the circular top portion for raising the temperature of the test specimen in said chamber and a thermocouple positioned inside of the chamber for indicating the temperature inside the chamber.

References Cited in the file of this patent
UNITED STATES PATENTS
2,332,943    Sobers _____ Oct. 26, 1943

OTHER REFERENCES

Bartholomew et al.: Article in Rev. Sci. Inst., March 1953, vol. No. 24, No. 3, pp. 196–202 relied on. Copy in Scientific Library and in Div. 36.    73–15.

"Semi-Conductors" (Hannay), published by Reinhold (New York), 1959. Page 113 relied on. Copy in Scientific Library.